(12) United States Patent
Imahori et al.

(10) Patent No.: US 7,941,044 B2
(45) Date of Patent: May 10, 2011

(54) IMAGE CAPTURING DEVICE

(75) Inventors: Yoshimasa Imahori, Osaka (JP); Takashi Toyoda, Osaka (JP); Yoshizumi Nakao, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 67 days.

(21) Appl. No.: 12/426,708

(22) Filed: Apr. 20, 2009

(65) Prior Publication Data

US 2009/0263121 A1 Oct. 22, 2009

(30) Foreign Application Priority Data

Apr. 21, 2008 (JP) ................. 2008-110279

(51) Int. Cl.
*G03B 41/00* (2006.01)
(52) U.S. Cl. ..................... 396/322; 359/819; 348/36
(58) Field of Classification Search .......... 348/340, 348/342; 396/440, 529, 322, 333; 359/818
See application file for complete search history.

(56) References Cited

U.S. PATENT DOCUMENTS

| | | | | |
|---|---|---|---|---|
| 5,412,509 A | * | 5/1995 | Nakata et al. ............... | 359/811 |
| 6,201,649 B1 | * | 3/2001 | Rudischhauser et al. ..... | 359/808 |
| 2004/0190164 A1 | * | 9/2004 | Bentley ......................... | 359/819 |
| 2004/0212903 A1 | * | 10/2004 | Nogami ......................... | 359/811 |
| 2005/0104995 A1 | * | 5/2005 | Spryshak et al. ............. | 348/360 |
| 2005/0212947 A1 | * | 9/2005 | Sato et al. ..................... | 348/340 |
| 2006/0044451 A1 | * | 3/2006 | Liang et al. ................... | 348/340 |
| 2007/0242946 A1 | * | 10/2007 | Toyoda et al. ................ | 396/322 |
| 2008/0030573 A1 | * | 2/2008 | Ritchey ......................... | 348/36 |

FOREIGN PATENT DOCUMENTS

JP 2007-065058 3/2007

* cited by examiner

*Primary Examiner* — Clayton E Laballe
*Assistant Examiner* — Leon W Rhodes
(74) *Attorney, Agent, or Firm* — Pillsbury Winthrop Shaw Pittman, LLP

(57) ABSTRACT

This image capturing device includes a fitting member, a lens attached by adhesive to the fitting member, and a light reception element. The light reception element is disposed so as to face the lens attached to the fitting member, and an image of a photographic subject is projected upon this light reception element by the lens. An image output unit is also provided which outputs this image of the photographic subject projected upon the light reception element by the lens. And an application aperture for adhesive is provided in the fitting member at a position facing a region of the lens which does not contribute to the image of the photographic subject outputted by the image output unit. Desirably, a plurality of such admission apertures are provided.

3 Claims, 9 Drawing Sheets

US 7,941,044 B2

IMAGE CAPTURING DEVICE

CROSS REFERENCE

This Nonprovisional application claims priority under 35 U.S.C. §119(a) on Patent Application No. 2008-110279 filed in Japan on Apr. 21, 2008, the entire contents of which are hereby incorporated by reference.

BACKGROUND OF THE INVENTION

The present invention relates to an image capturing device in which a lens is attached to a fitting member by adhesion.

In the prior art, there is a per se known type of image capturing device in which an image of a photographic subject is projected upon a light reception element by a lens which faces the light reception element, and in which this image of the photographic subject which has thus been projected is captured. With this type of image capturing device, the lens is attached to a fitting member. And the fitting member is attached inside a case of the image capturing device.

There are various types of structure for attaching the lens to the fitting member. For example, there is a structure in which an engagement member is attached to the fitting member, and the lens is engaged with this engagement member. With this type of structure, a dedicated engagement member is required for attaching the lens. Due to this, the number of components is increased and the number of manufacturing processing is increased, so that the manufacturing cost rises. Thus, in Japanese Laid-Open Patent Publication 2007-065058, a structure has been proposed in which, in order to attach the lens to the fitting member while preventing increase of the manufacturing cost, the lens is fixed to the fitting member with adhesive.

However, with this structure proposed in Japanese Laid-Open Patent Publication 2007-065058, the adhesive is applied to the edge of the lens surface, and then the periphery of the lens is attached to the fitting member. When the adhesive which has been applied hardens, due to contraction of the adhesive, the lens may shift relatively to the fitting member from its position in which it was attached thereto. Thus, if there is some difference somewhere in the amount of adhesive which is applied around the edge of the lens, the position of the lens may change relative to the position in which it was originally adhered, which is undesirable. Due to this, it sometimes happens that the lens becomes tilted relatively to the fitting member. And if the lens tilts relative to the fitting member, then deviation of the optical axis occurs, which is very undesirable.

Accordingly, with such a prior art image capturing device, the accuracy with which the lens has been fitted has been poor. Moreover, if the relative position of the lens deviates, then the lens becomes unable to project an adequate image upon the light reception element. Due to this, with a prior art type image capturing device, sometimes it has been impossible to obtain an adequate image.

Thus, the objective of the present invention is to provide an image capturing device with which, while suppressing increase of the number of components and elevation of the manufacturing cost, it is nevertheless possible to enhance the accuracy with which the lens is attached.

SUMMARY OF THE INVENTION

The image capturing device according to the present invention includes a fitting member, a lens attached by adhesive to the fitting member, a light reception element which is disposed so as to face the lens attached to the fitting member and upon which an image of a photographic subject is projected by the lens, and an image output unit which outputs the image of the photographic subject projected upon the light reception element. And an application aperture for adhesive is provided in the fitting member at a position facing a region of the lens which does not contribute to the image of the photographic subject outputted by the image output unit. It is desirable for a plurality of such admission apertures to be provided.

With the above structure, when adhering the lens to the fitting member, a workman is able to apply adhesive through the admission aperture of the fitting member. Moreover, even if the amount of adhesive which has been applied through the admission aperture is not accurate, when the adhesive has hardened, the excess adhesive remains within the admission aperture.

DETAILED DESCRIPTION OF THE INVENTION

Figure 1:
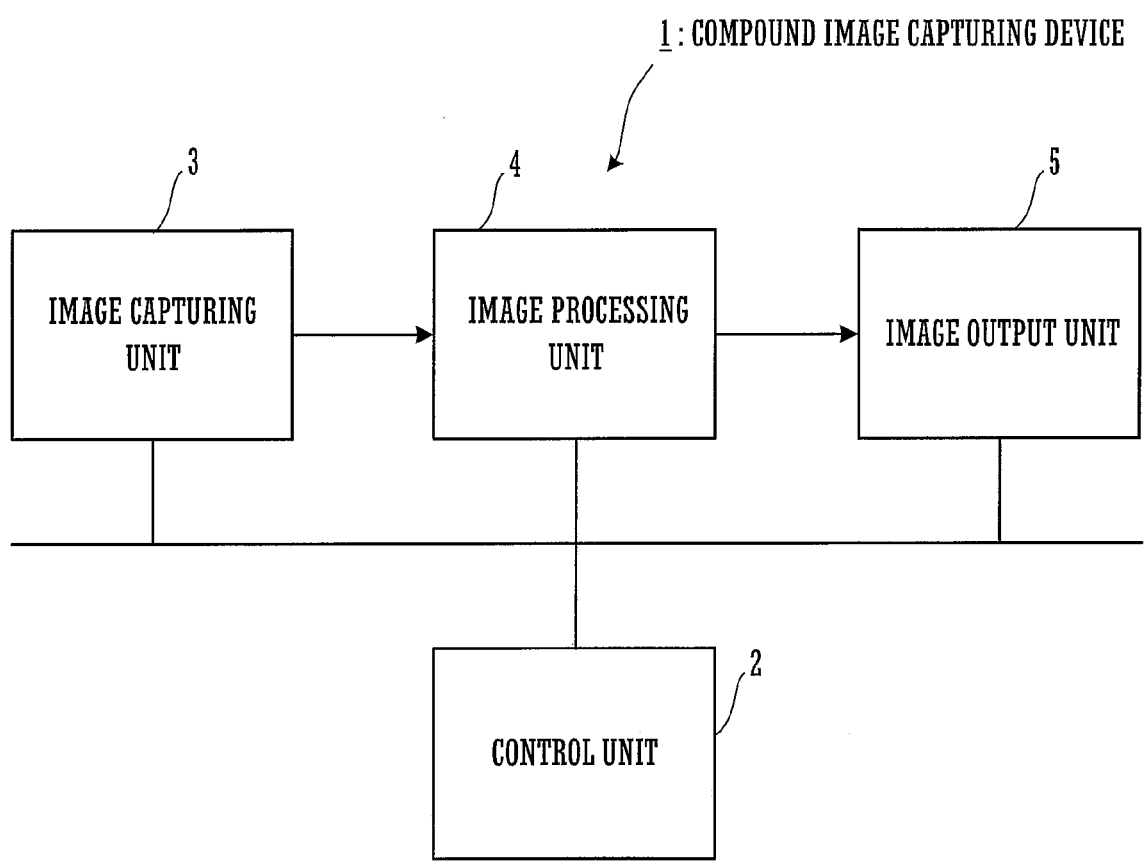
FIG. 1 is a block diagram showing the structure of the main portions of a compound image capturing device.

FIG. 1 is a block diagram showing the structure of the main portions of a compound image capturing device to which the present invention has been applied. This compound image capturing device 1 comprises a control unit 2, an image capturing unit 3, an image processing unit 4, and an image output unit 5. The compound image capturing device 1 is a compound image capturing device which captures a panorama image. And the compound image capturing device 1 creates a single panorama image by combining images from a plurality of image regions upon which images of the photographic subject have been projected. The details of this capturing of a panorama image will be described hereinafter.

The control unit 2 controls the operation of the main sections of the main body of this compound image capturing device 1.

Figure 2:
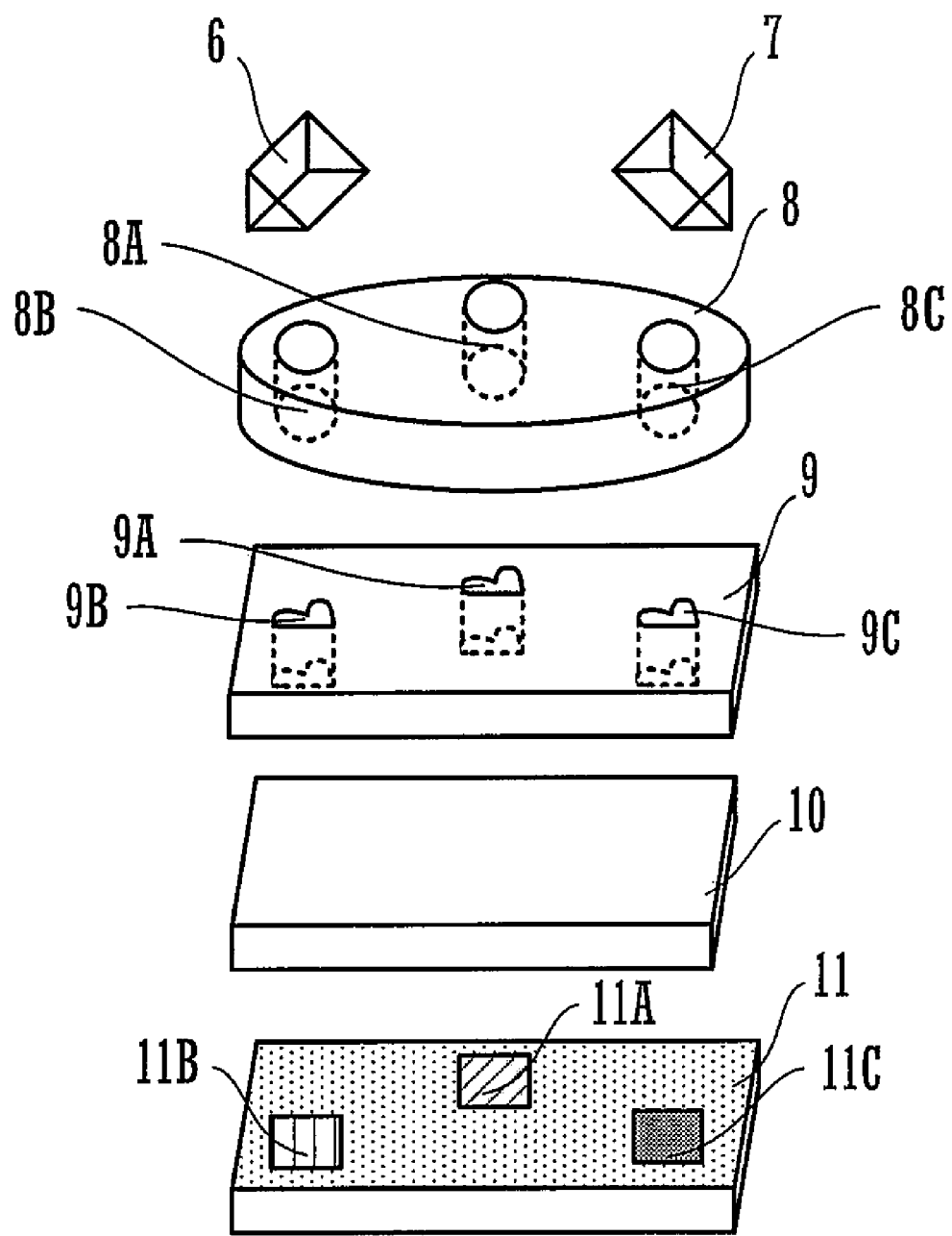
FIG. 2 is an exploded perspective view showing the structure of an image capturing unit.

FIG. 2 is an exploded perspective view showing the structure of the image capturing unit 3. This image capturing unit 3 comprises prisms 6 and 7, a lens array 8, a partition wall 9, an infrared ray cutout filter 10 (hereinafter termed the "IRCF 10"), and a light reception element 11.

Figure 3:
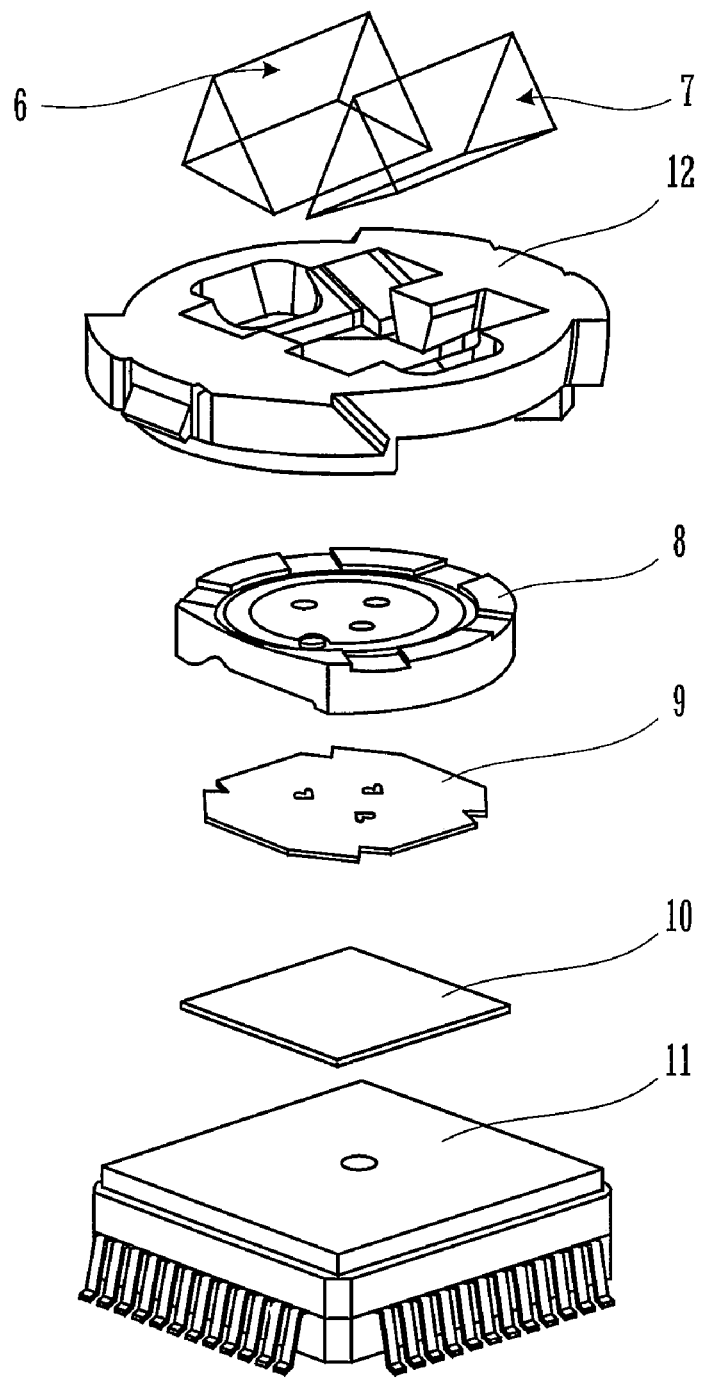
FIG. 3 is an exploded perspective view showing the external appearance of a fitting member, a lens array, a partition wall, an infrared ray cutout filter, and a light reception element.

The prisms 6 and 7 are mounted upon a fitting member 12 (refer to FIG. 3). These prisms 6 and 7 refract or reflect light beams which are incident into the image capturing unit 3.

In the following explanation, a light beam which has not passed through either of the prisms 6 and 7 will be termed the "first light beam", a light beam which has been incident into the prism 6 and has been refracted or reflected will be termed the "second light beam", and a light beam which has been incident into the prism 7 and has been refracted or reflected will be termed the "third light beam".

The lens array 8 has a plurality of unit lenses 8A through 8C. The lens array 8 is also called compound lens. The unit lenses 8A through 8C are also called facet lenses. This lens array 8 is inserted into the fitting member 12 which will be described hereinafter, and is then bonded thereto. In FIG. 2, a lens array 8 is shown which has a total of three unit lenses 8A through 8C. The prism 6 is held by the fitting member 12 in a position to oppose the unit lens 8B. Moreover, the prism 7 is held by the fitting member 12 in a position to oppose the unit lens 8C. The first light beam is incident into the unit lens 8A. Moreover, the second light beam is incident into the unit lens 8B. Similarly, the third light beam is incident into the unit lens 8C. The details of this lens array 8 will be described hereinafter.

The light reception element 11 is arranged so as to oppose the lens array 8. Between the lens array 8 and the light reception element 11, the partition wall 9 and the IRCF 10 are disposed so as to be arranged in that order.

It should be understood that, during implementation, it would also be acceptable for the positions of the partition wall and the infrared ray cutout filter to be reversed. In other words, the infrared ray cutout filter and the partition wall might be arranged in that order between the lens array and the light reception element.

The partition wall 9 is a plate shaped optical dividing wall, and provided with opening portions 9A through 9C are provided therein. This partition wall 9 is attached to the lens array 8. Due to this, it is indirectly attached to the fitting member 12. Moreover, these opening portions 9A through 9C are provided in positions which oppose the unit lenses 8A through 8C, in the state in which the partition wall 9 is attached to the lens array 8. The first beam which is emitted from the unit lens 8A is incident into the opening portion 9A. And the second beam which is emitted from the unit lens 8B is incident into the opening portion 9B. Moreover, the third beam which is emitted from the unit lens 8C is incident into the opening portion 9C.

The partition wall 9 delimits images of the photographic subject which are projected by the unit lenses 8A through 8C. In other words, the partition wall 9 delimits image capture regions upon the light reception element 11 upon which images of the photographic subject are projected by the unit lenses 8A through 8C. Each of the first through the third light beams which passes through its respective opening portion 9A through 9C projects a unit image of the photographic subject upon a corresponding image capturing region of the light reception element 11. In detail, the first light beam which is emitted from the opening portion 9A is projected upon an image region 11A. And the second light beam which is emitted from the opening portion 9B is projected upon an image region 11B. Moreover, the third light beam which is emitted from the opening portion 9C is projected upon an image region 11C.

The partition wall 9 prevents the first through the third light beams from being projected upon any regions of the light reception element 11 other than those to which they respectively correspond, as detailed above. Moreover, the partition wall 9 functions as a shield, and intercepts any light other than these light beams from the unit lenses 8A through 8C. Due to this, the partition wall 9 prevents any light rays other than those from the unit lenses 8A through 8C from being projected upon the light reception element 11. The details of the partition wall 9 will be described hereinafter.

The IRCF 10 is a rectangular plate. This IRCF 10 intercepts infrared radiation included in the first through the third light beams. The details of this IRCF 10 will be explained hereinafter.

The image processing unit 4 creates a panorama image of the photographic subject by performing combination processing upon the plurality of unit images captured by the image capturing unit 3, to produce a single image.

And the image output unit 5 has an interface which connects to an external device such as a display device, a printing device, or the like. This image output unit 5 outputs a signal corresponding to the panorama image which has been created by the image processing unit 4 to this external device.

It should be understood that it would also be acceptable to arrange for the image output unit to include a display unit, and to display the panorama image which has been created by the image processing unit 4 upon this display unit.

Next, the capturing of a panorama image by this compound image capturing device 1 will be explained.

When a shutter not shown in the figures is actuated, the compound image capturing device 1 captures an image of the photographic subject which is projected upon the light reception element 11 of the image capturing unit 3. With the compound image capturing device 1 according to this embodiment, for example, the three unit images which are projected upon the light reception element 11 may be captured as a compound image by the per se known rolling shutter method.

The light rays which are incident upon the image capturing unit 3 are separated into three light beams, i.e. into the first through the third light beams described above. Each of these first through third light beams corresponds to its respective one of the unit lenses 8A through 8C and its respective one of the opening portions 9A through 9C. Light rays which are not incident upon any of the opening portions 9A through 9C do not exert any influence upon the light reception element 11, since they are intercepted by the partition wall 9 and thus do not reach the light reception element 11.

The image processing unit 4 combines the plurality of unit images which are captured by the image capturing unit 3 into a single image, and performs processing to create a panorama image. And the image output unit 5 outputs a signal corresponding to this panorama image which has been produced by the image processing unit by combination.

It should be understood that it would also be acceptable to use the structure of this embodiment for a compound image capturing device which captures high definition images. In this case, in such a compound image capturing device, no prisms would be fitted to the image capturing unit, and the parallax of the unit images projected by the three unit lenses upon the light reception element would be detected by the image processing unit. And the compound image capturing device would create a reconstructed image on the basis of this parallax.

Next, the various structures will be explained.

FIG. 3 is an exploded perspective view showing the external appearance of various structures including the fitting member 12, the lens array 8, the partition wall 9, the IRCF 10, and the light reception element 11. A workman inserts the lens array 8 into the fitting member 12 from its side which faces the light reception element 11. And the workman fixes the lens array 8 to the fitting member 12 by adhesive. The light reception element 11 is disposed so as to oppose the lens array 8. The partition wall 9 is disposed between the lens array 8 and the light reception element 11. And the IRCF 10 is disposed between the partition wall 9 and the light reception element 11. Moreover, the prisms 6 and 7 are fixed to the surface of the fitting member 12 which does not face the light reception element 11.

Figure 4A:
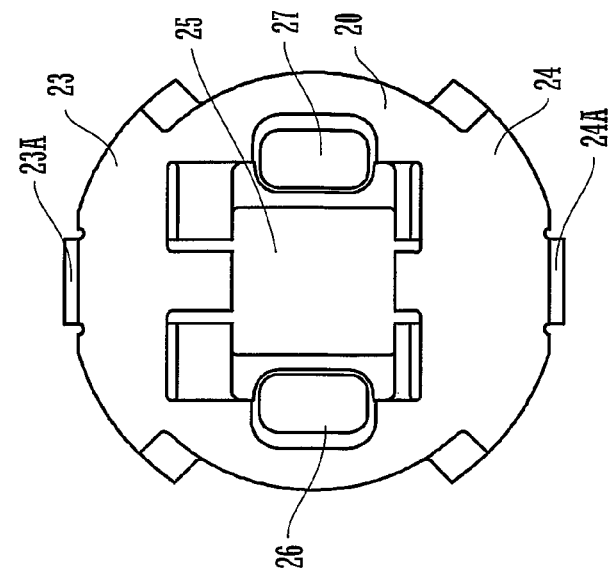
FIGS. 4(A) through 4(D) are a rear view, side views, and an elevation view of the fitting member.
Figure 4B:
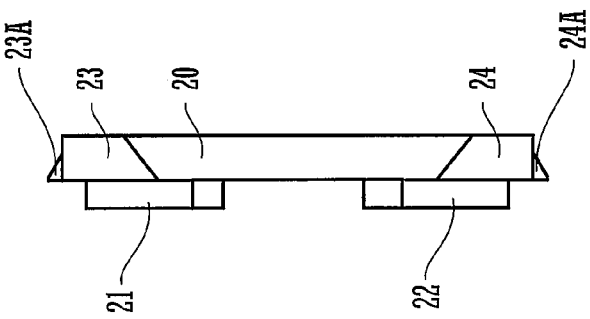
Figure 4C:
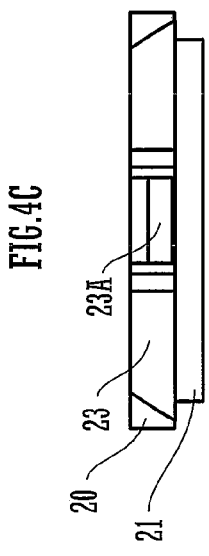
Figure 4D:
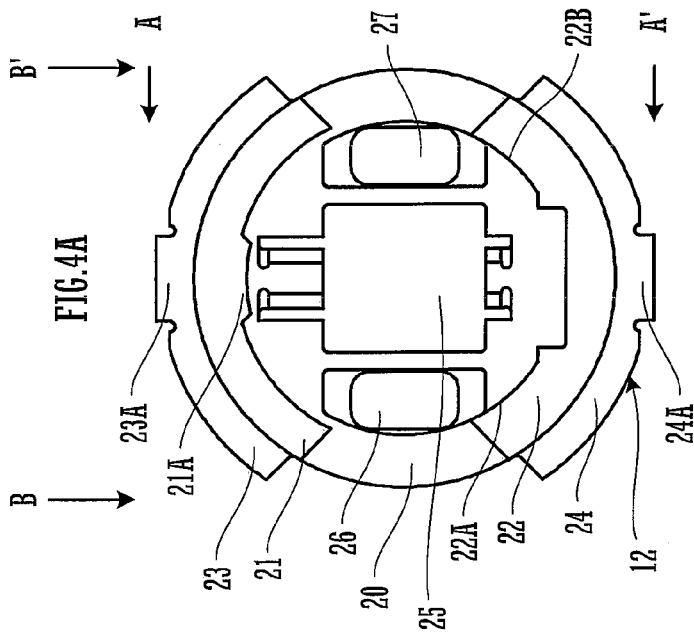

Next, the fitting member 12 will be explained. FIGS. 4(A) through 4(D) are figures showing this fitting member 12. FIG. 4(A) is a rear view of the fitting member 12. FIG. 4(B) is a side view thereof as viewed in the direction shown by the arrows A-A' in FIG. 4(A). And FIG. 4(C) is a side view thereof as viewed in the direction shown by the arrows B-B' in FIG. 4(A). Moreover, FIG. 4(D) is an elevation view of this fitting member 12.

It should be understood that, in the following explanation, the surface of the fitting member 12 which faces the light reception element 11 will be termed the "holder lower surface", while the surface of the fitting member 12 which does not face the light reception element 11 will be termed the "holder upper surface".

The fitting member 12 comprises a circular lens holder 20, position determination portions 21 and 22, and claw portions 23 and 24. The fitting member 12 is made from resin.

It should be understood that, in an actual implementation, it would be acceptable for the fitting member 12 to be made from some material other than resin.

The lens holder 20 also has a prism fitting portion 25. Rectangular opening portions 26 and 27 are provided in the lens holder 20. The prism fitting portion 25 is provided in the central portion of the lens holder 20. And the prisms 6 and 7 are fitted into the prism fitting portion 25 from the holder upper surface.

It should be understood that the opening portions 26 and 27 correspond to the "admission aperture" of the Claims.

The opening portions 26 and 27 are apertures through which adhesive for adhering the lens array 8 to the fitting member into which it has been inserted is applied. Moreover, these opening portions 26 and 27 are provided at positions which oppose regions of the lens array 8 which do not contribute to the images of the photographic subject which are outputted by the image output unit 5. In concrete terms, they are provided so as to oppose regions of the lens 8 at which the unit lenses 8A through 8C are not provided. In this embodiment, the opening portions 26 and 27 are provided so as to oppose the central position of the lens holder 20.

It should be understood that, in an actual implementation, it would also be acceptable for these opening portions to be of some shape other than rectangular. Moreover, the number of these opening portions provided in the lens holder is not limited to being two; there could be one thereof or three or four thereof, and there could also be more. However, it is desirable for a plurality of these opening portions to be provided. Furthermore, if a plurality of these opening portions are provided, then it is desirable for the gaps between these opening portions to be spaced at regular intervals in the circumferential direction of the lens holder. Moreover, the positions at which this plurality of opening portions are provided should be located at positions which do not oppose any of the unit lenses included in this lens array. By doing this, it is possible to prevent deviation of the relative position of the lens array occurring during adhesion of the lens array. Accordingly, the accuracy of attachment of the lens array is further enhanced. Furthermore, since the accuracy of attachment of the lens array is thus enhanced, it becomes difficult for the relative position of the lens array relative to the fitting member to change.

The position determination portions 21 and 22 are provided upon the holder lower surface. Moreover, on the position determination portion 21, there is provided a contacting portion 21A which contacts against the circumferential surface of the lens array 8, in the state in which the lens array 8 is attached to the holder lower surface. And, on the position determination portion 22, there are provided engagement portions 22A and 22B which are engaged with the circumferential surface of the lens array 8, in the state in which the lens array 8 is attached to the holder lower surface. The contacting portion 21A and the engagement portions 22A and 22B are positioned at the vertices of an equilateral triangle.

The claw portions 23 and 24 are provided around the circumferential surface where the position determination portions 21 and 22 are provided. Respective claws 23A and 24A are formed integrally upon these claw portions 23 and 24. These claws 23A and 24A are disposed so as to face the holder upper surface, and engage with a prism fitting member not shown in the figures, which holds the prisms 6 and 7. Due to this, the prisms 6 and 7 are held to the holder upper surface by the prism fitting member not shown in the figures.

It should be understood that, in an actual implementation, it would be acceptable for the shape of this lens holder to be different.

Figure 5D:
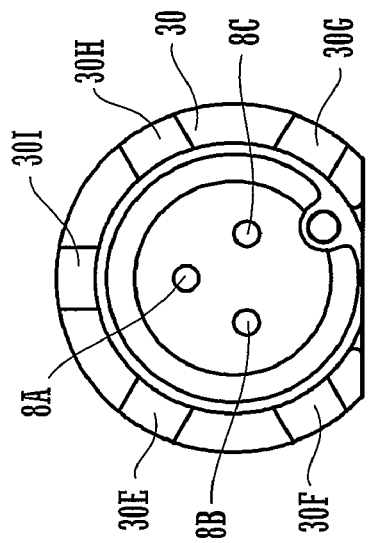
FIGS. 5(A) through 5(D) are a rear view, side views, and an elevation view of the lens array.
Figure 5B:
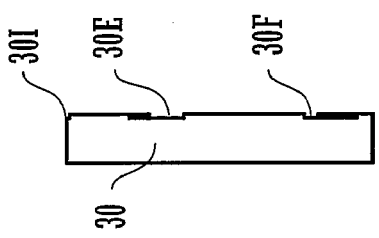
Figure 5A:
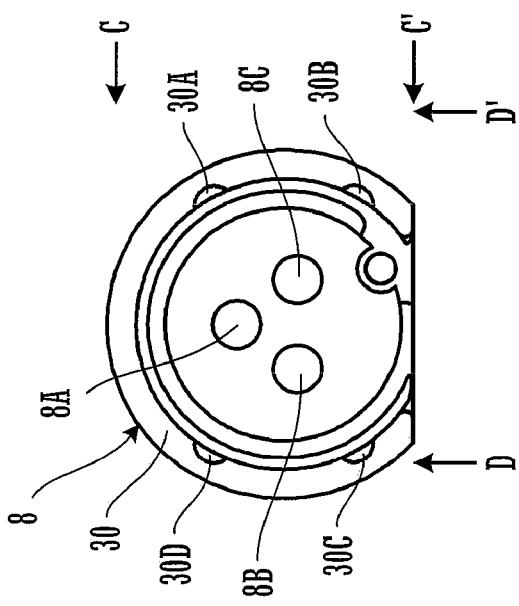
Figure 5C:

Next, the lens array 8 will be explained. FIGS. 5(A) through 5(D) are figures showing this lens array 8. FIG. 5(A) is a rear view of the lens array 8. FIG. 5(B) is a side view thereof as viewed in the direction shown by the arrows C-C' in FIG. 5(A). And FIG. 5(C) is a side view thereof as viewed in the direction shown by the arrows D-D' in FIG. 5(A). Moreover, FIG. 5(D) is an elevation view of this lens array 8.

It should be understood that, in the following explanation, the surface of the lens array 8 which does not face the light reception element 11 will be termed the "lens upper surface", while the surface of the lens array 8 which faces the light reception element 11 will be termed the "lens lower surface".

The lens array 8 consists of a part-circular backing material section 30 and the plurality of unit lenses 8A through 8C.

The backing material section 30 has position determination portions 30A through 30D and groove portions 30E through 30I.

The position determination portions 30A through 30D are provided on the lens lower surface of the backing material section 30. These position determination portions 30A through 30D, which are semi-circular, are provided at four spots which are positioned at the corner portions of the partition wall 9, in the state in which the partition wall 9 is attached to the lens array 8. Moreover, the corner portions of the partition wall 9 engage with and contact their respective ones of the position determination portions 30A through 30D. Due to this, it is possible to perform the determination of the relative position of the lens array 8 and the partition wall 9 in a simple manner. Moreover, by provided the four position determination portions 30A through 30D in four spots, it is possible to prevent positional deviation of the partition wall 9, after the partition wall 9 has been attached to the lens array 8.

The groove portions 30E through 30I are provided upon the lens upper surface. When the lens array 8 is inserted into the fitting member 12, these groove portions 30E through 30I receive projecting portions not shown in the figures which are provided upon the holder lower surface. By this structure, positional determination when the lens array 8 is inserted into the fitting member 12 becomes simple and easy.

The unit lenses 8A through 8C are fixed at the central portion of the backing material section 30.

It should be understood that the shape of the backing material section may be varied as appropriate. Moreover, the positions and the numbers of the unit lenses may also be varied as appropriate. Yet further, the numbers and the shapes of the position determination portions and the groove portions may also be varied as appropriate. If the number or the shape of the position determination portions is changed, then the number or the shape of the sites upon the partition wall 9, which will be described hereinafter, should be changed to match. Moreover, if the number or the shape of the groove portions is changed, then the number or the shape of the projecting portions which are provided upon the fitting member 12 should be changed to match.

Figure 6:
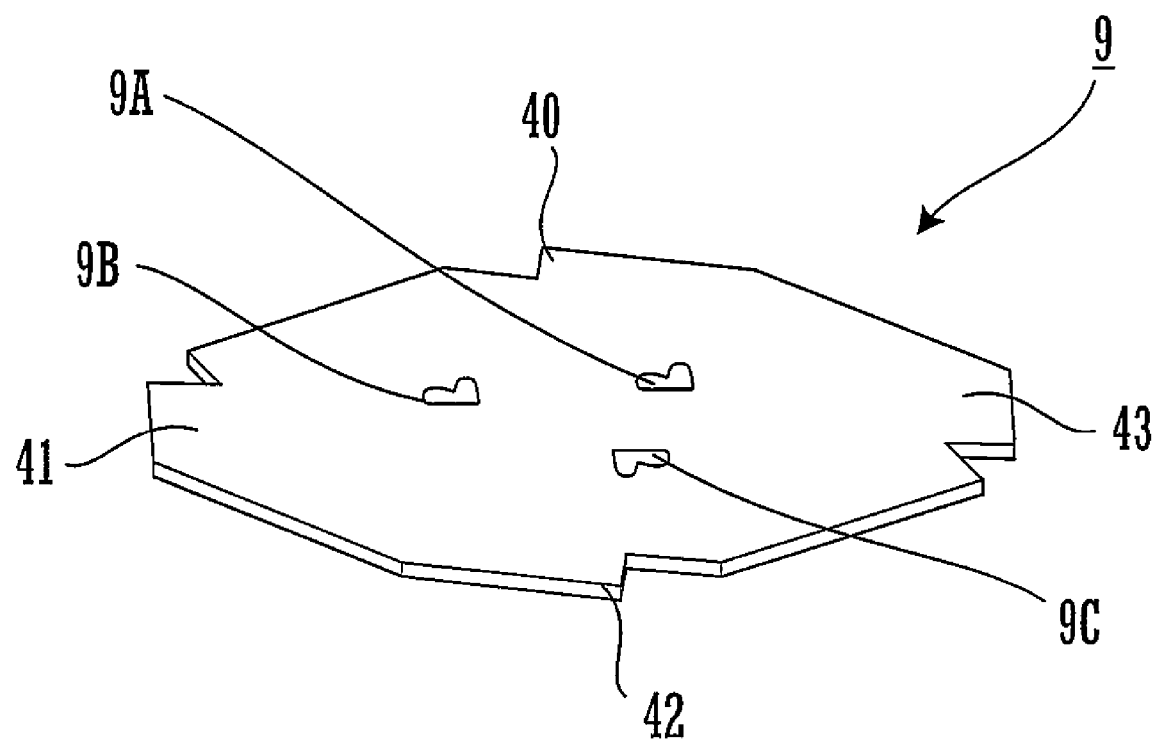
FIG. 6 is a perspective view of the partition wall.

Next the partition wall 9 will be explained. FIG. 6 is a perspective view of this partition wall 9.

The partition wall 9 is a hexagonal plate. Opening portions 9A through 9C are provided in the center portion of the partition wall 9. These opening portions 9A through 9C are arranged around a circumference, and are provided at intervals of 120° with respect to the center of the partition wall 9. And these opening portions 9A through 9C are provided in positions which oppose the unit lenses 8A through 8C of the lens array 8. Moreover, the corner portions 40 through 43 of this partition wall 9 are cut out with V-shaped notches, whose two opposing sides intersect at acute angles. In the state in which the partition wall 9 is fitted to the lens array 8, these corner portions 40 through 43 engage with the above described position determination portions 30A through 30D. It should be understood that the shapes of these notches may be varied as appropriate.

Figure 7:
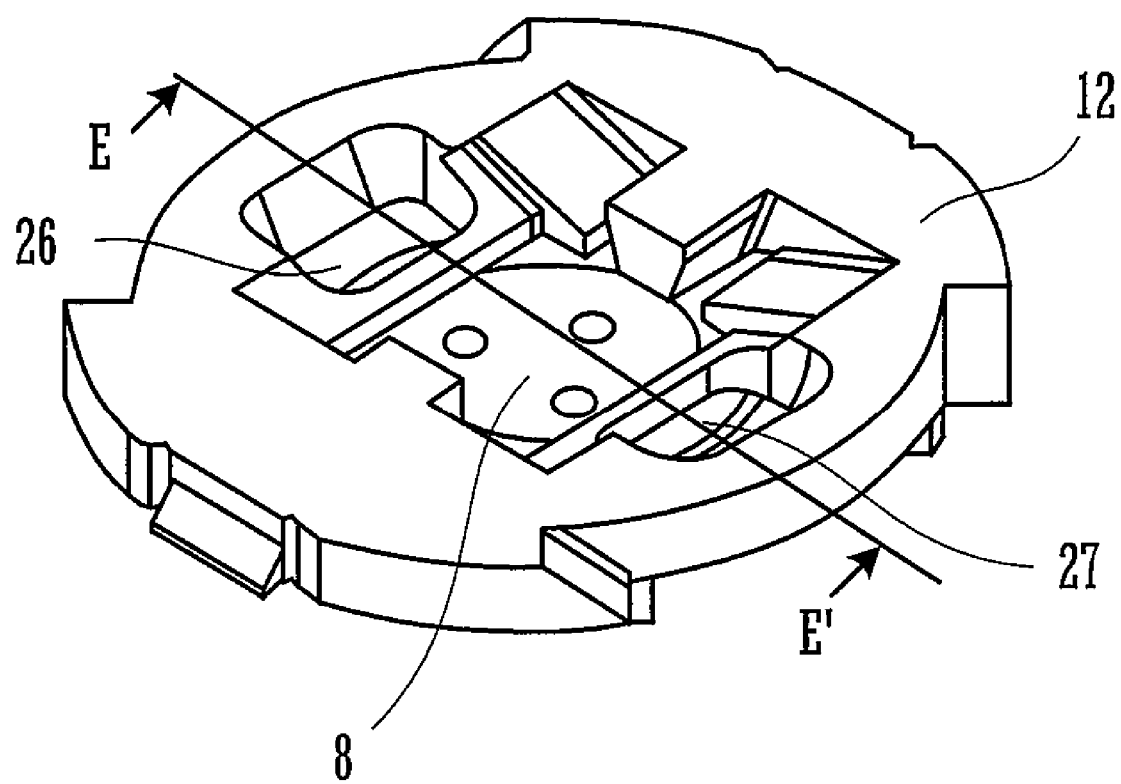
FIG. 7 is an external perspective view showing the state in which the lens array is attached to the fitting member.
Figure 8:
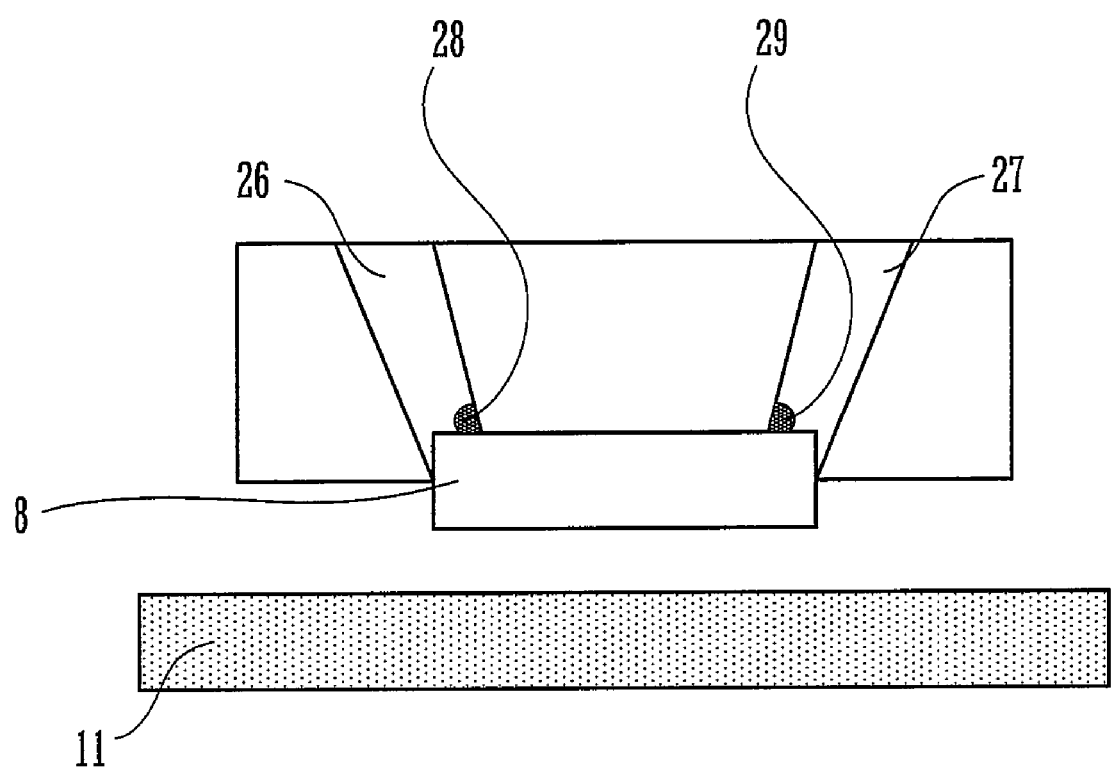
FIG. 8 is a sectional view showing this state in which the lens array is attached to the fitting member.
Figure 9:
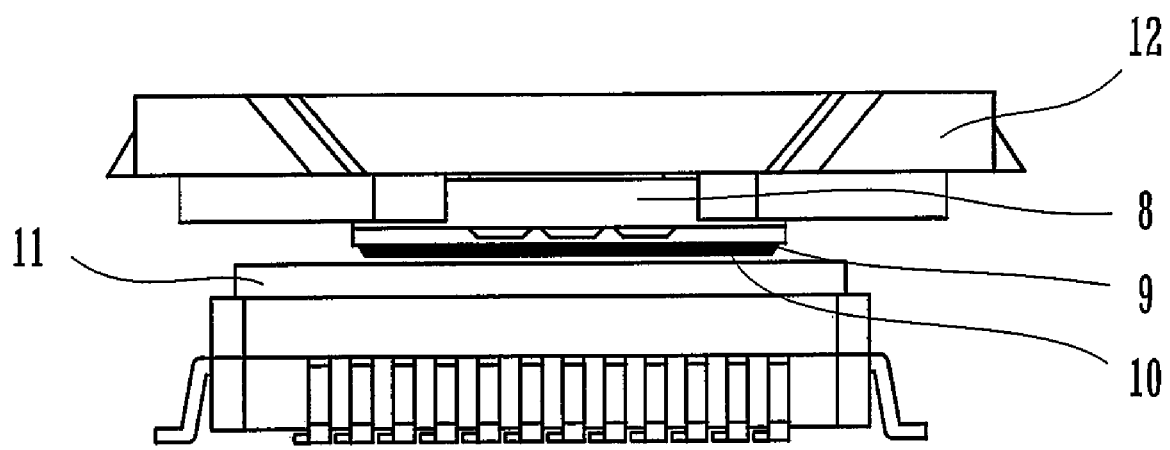
FIG. 9 is a figure showing the state in which the lens array, the partition wall, and the infrared ray cutout filter are fitted to the fitting member.

Next, the way in which the lens array 8 is inserted into the fitting member 12, and is fitted thereto with adhesive, will be explained. FIG. 7 is an perspective view showing the external appearance of the fitting member 12 and the lens array 8, in the state in which the lens array 8 has been fitted to the fitting member 12. And FIG. 8 is a sectional view taken in a plane shown by the arrows E-E' in FIG. 7. Moreover, FIG. 9 is a view showing the external appearance of the image capturing unit 3, in which the lens array 8, the partition wall 9, and the IRCF 10 are fitted in that order to the fitting member 12, and the light reception element 11 is disposed so as to face the fitting member 12.

It should be understood that the reference symbols are omitted from the cross sectional view of FIG. 8.

The lens array 8 is inserted into the holder lower surface, and is fixed to the fitting member 12 with adhesive. In concrete terms, in the state as described above in which the lens array 8 is inserted into the fitting member 12, the groove portions 30E through 30I receive the projecting portions, not shown in the figures, which are provided upon the holder lower surface. Moreover, in this state, the contacting portion 21A contacts against the circumferential surface of the lens array 8, and the engagement portions 22A and 22B are engaged with the periphery of the lens array 8. In this manner, the positional determination of the lens array 8 is performed. When this positional determination of the lens array 8 has been completed, the workman applies adhesive blobs 28 and 29 from the holder upper surface through the opening portions 26 and 27. These adhesive in these blobs 28, 29 which have been applied at this time is an optically hardening type adhesive. And, when the application of the adhesive blobs 28 and 29 has been completed, the workman irradiates light through the opening portions 26 and 27, and thereby causes the adhesive blobs 28 and 29 to harden. Due to this, the lens array 8 is adhered to the fitting member 12.

Furthermore, while an optically hardening type adhesive is used in this embodiment, it would also be acceptable, in an actual implementation, to use some other type of adhesive.

Next, the partition wall 9 is attached to the lens array 8. The partition wall 9 is fitted by being inserted into the lens lower surface. In concrete terms, in this state, the corner portions 40 through 43 contact and are engaged with the position determination portions 30A through 30D. Accordingly, the partition wall 9 is attached to the lower surface of the lens array 8.

And the IRCF 10 is attached to the surface of this partition wall 9 which faces the light reception element 11. As the method of attaching the IRCF 10 to the partition wall 9, for example, a method of adhering with adhesive may be employed.

In this manner, the fitting member 12 and the light reception element 11 are fitted to this compound image capturing device 1.

By the above, when the lens array 8 is to be stuck to the fitting member 12, the workman is able to apply the adhesive through the opening portions 26 and 27 of the fitting member 12. Moreover, even if the amount of adhesive which is applied through the opening portions 26 and 27 is not accurate, when the adhesive has hardened, the excess adhesive remains within the opening portions 26 and 27. Due to this, no pulling force acts upon the lens array 8 from the side of the light reception element 11, but any such force rather acts from the side of the fitting member 12. Accordingly, no tilting of the lens array 8 is caused.

Thus, since no deviation of the optical axis of the lens array 8 occurs, accordingly the fitting accuracy of the lens array 8 is enhanced. Moreover, since the lens array 8 is fixed to the fitting member 12 with adhesive, accordingly no dedicated component is required for fitting the lens array 8. Therefore it is possible to prevent elevation of the manufacturing cost caused by increase in the number of component parts and the like.

It should be understood that, in an actual implementation, it would also be acceptable for the position determination portions which are provided to the lens array and the corner portions of the partition wall to be contacted in some state other than one in which they are engaged together. For example, it would be acceptable for the partition wall to be contacted in a state in which it has been fitted into position delimitation portions; or it would also be acceptable for it to be contacted in some other state. Moreover, it would also be acceptable for sites upon the partition wall other than its corner portions to be contacted against the position determination portions which are provided upon the lens array.

Furthermore although, in the embodiment described above, an example was explained of a compound image capturing device including a lens array having a plurality of unit lenses, in an actual implementation, it would also be acceptable for this to be a single lens image capturing device which has only a single lens. In this case, it will be sufficient for the opening portion or portions provided upon the fitting member to be provided so as to oppose a region or regions of the single lens corresponding to a region of the light reception element, upon which the image of the photographic subject is not projected.

What is claimed is:

1. An image capturing device, comprising:
    a fitting member;
    a lens array having a plurality of unit lenses, the lens array being attached by an adhesive to the fitting member;
    a light reception element which is disposed so as to face the lens array attached to the fitting member, and upon which an image of a photographic subject is projected by each of the unit lenses of the lens array;
    an infrared ray cutout filter which is disposed between the lens array and the light reception element;
    a partition wall, disposed between the lens array and the light reception element, through which only a light beam emitted from each of the unit lenses can pass, and which divides an image capture region upon the light reception element into a plurality of image capture regions;

an image processing unit which combines together a plurality of images of the photographic subject which are projected upon the plurality of image capture regions of the light reception element, to produce a single image of the photographic subject; and an image output unit which outputs an image signal corresponding to the single image of the photographic subject produced by the image processing unit;

wherein an application aperture for the adhesive is provided in the fitting member at a position facing a region of the lens array, at which the unit lenses are not provided.

2. The image capturing device according to claim 1, wherein a plurality of application apertures are provided in the fitting member.

3. The image capturing device according to claim 1, further comprising a first prism and a second prism which are mounted upon the fitting member, wherein the plurality of unit lenses are a first unit lens, a second unit lens, and a third unit lens, a first light beam which has not passed through either of the first prism and the second prism is incident into the first unit lens, a second light beam which has been incident into the first prism and has been refracted or reflected is incident into the second unit lens, and a third light beam which has been incident into the second prism and has been refracted or reflected is incident into the third unit lens, wherein the partition wall is provided with a first opening portion, a second opening portion, and a third opening portion, the first light beam emitted from the first unit lens is incident into the first opening portion, the second light beam emitted from the second unit lens is incident into the second opening portion, and the third light beam emitted from the third unit lens is incident into the third opening portion, wherein the infrared ray cutout filter intercepts infrared radiation included in the first light beam, the second light beam, and the third light beam, and wherein the image capture region upon the light reception element are divided into a first image region, a second image region, and a third image region by the partition wall, the first light beam emitted from the first opening portion provided in the partition wall is projected upon the first image region, the second light beam emitted from the second opening portion provided in the partition wall is projected upon the second image region, and the third light beam emitted from the third opening portion provided in the partition wall is projected upon the third image region.

* * * * *